United States Patent Office 3,458,438
Patented July 29, 1969

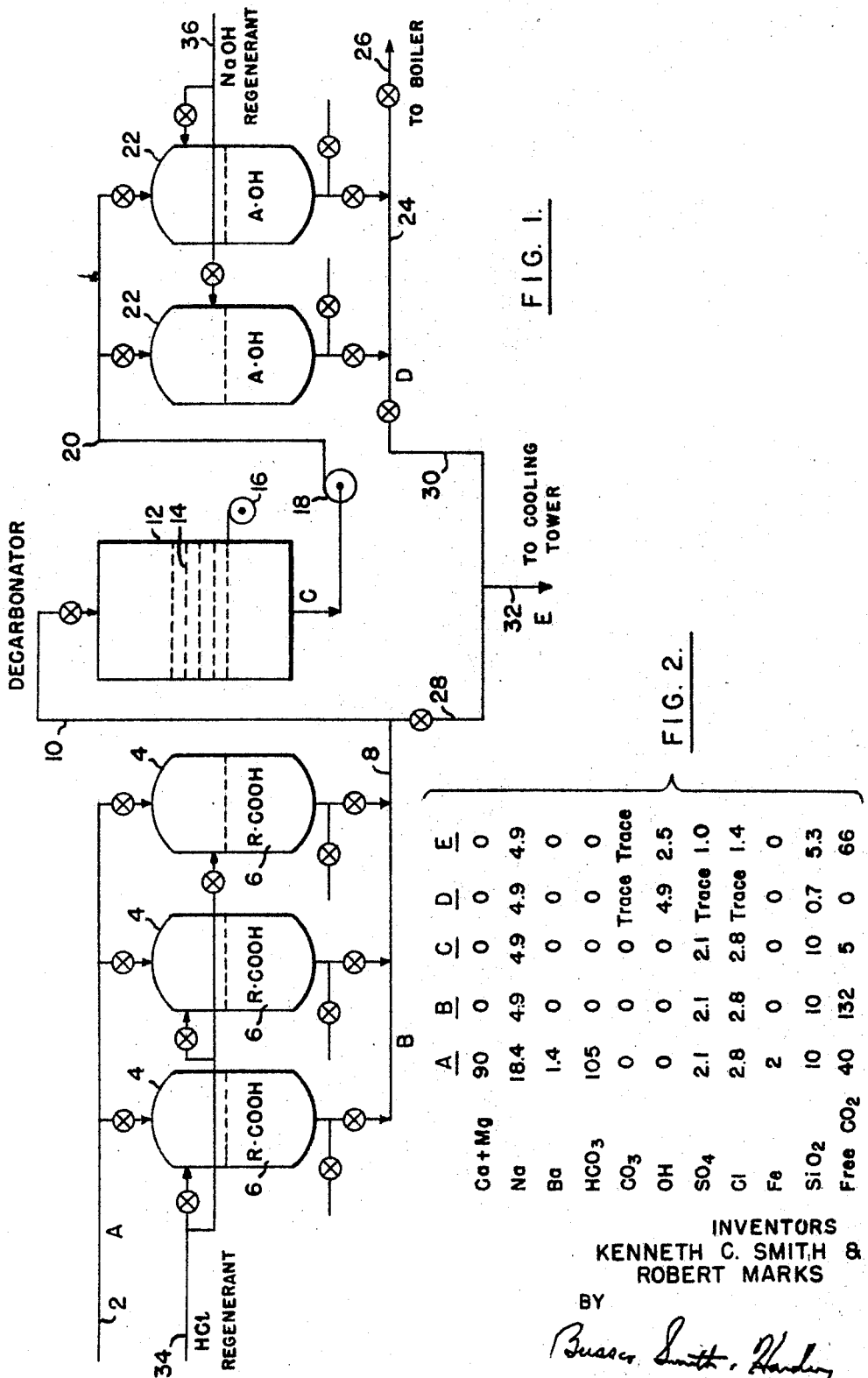

3,458,438
METHOD AND APPARATUS FOR
WATER TREATMENT
Kenneth C. Smith, Willow Grove, and Robert Marks,
Malvern, Pa., assignors to Crane Co., Chicago, Ill., a
corporation of Illinois
Filed Mar. 9, 1966, Ser. No. 532,911
Int. Cl. C02b 1/68, 1/40
U.S. Cl. 210—26                                             4 Claims

ABSTRACT OF THE DISCLOSURE

Water is treated for removal of hardness and reduction of silica content by passing it through a cation exchange resin of carboxylic type to remove heavier metal cations, but only partial removal of alkali metal cations; by then removing carbon dioxide from part of the effluent from the cation exchange resin; passing that part of the effluent through an anion exchange resin of hydroxyl type capable of removing acid anions and substantial reduction of silica and providing an alkaline effluent; and by then admixing portions of the effluent from both anion and cation exchange resins to provide water with hardness removed and a silica content less than that of the original water.

---

This invention relates to water treatment and has particular reference to a method and apparatus involving highly economical operation consistent with the production of desired results. In particular it relates to silica removal by anion hydroxyl exchange (salt splitting).

Removal of hardness, silica and other solids from water is required for various purposes such as boiler feed and cooling tower feed. Complete demineralization may be prohibitively expensive in some cases and actually not applicable in others. An example involving special problems is that of treatment of cooling tower water. If makeup for such towers is of raw water containing ordinary solutes, in operation these accumulate to the extent that blowdown would be called for from time to time. But usually to avoid corrosion a soluble chromate is introduced, and with this present, blowdown would not only involve loss of the expensive chromate ion but would also not be generally permited because of contamination which blowdown would introduce into streams or ground water. While the chromate ion may be removed by suitable exchange procedure, in accordance with the present invention a different approach is involved in that concentration of solid solutes is reduced to a satisfactory level without attempting complete deionization of the makeup water. Cooling towers involve the carrying out of water by the wind in the form of a mist, and if the concentration of solid solutes is kept sufficiently low a satisfactory equilibrium concentration condition is reached avoiding the necessity for blowdown.

In accordance with the invention a procedure is adopted in which, for example, a single water treating unit may be used to provide two grades of water, one grade being suitable for boiler use, and characterized by very low silica content, while the lower grade may be used for cooling tower use. In such a unit, cost of operation is lowered very considerably by minimizing the use of regenerating chemicals. This involves, in part, the use of carboxylic cation exchange resin with advantages which will become clearer hereafter. The objects of the invention relate to the attainment of optimum results under conditions such as indicated above and will become apparent from the following description read in conjunction with the accompanying drawing in which:

FIGURE 1 is a diagram of typical apparatus which may be used and from which the method will become apparent; and FIGURE 2 is a chart illustrating a typical operation and having lettered columns showing typical compositions appearing at correspondingly lettered locations in FIGURE 1, constituents being indicated in parts per million.

The diagram outlines only the essential parts of the apparatus without details of construction of the various elements which may be conventional as well understood in the art. Various connections and valves involved in overall operation are also omitted since they are conventional, as for example the connections involved in backwashing and rinsing. Control of operations may be automatic or manual, and the manipulations which are involved will be apparent from consideration of the steps involved in operation.

A specific type of installation will be considered, and from this variations will be evident as will be required for particular end results and the handling of various types of raw water.

The raw water enters the treating system at 2, and there are indicated in column A of FIGURE 2 the cationic and anionic constituents which were present in a particular instance and which are typical. For example, it may be assumed that in the raw water calcium, magnesium, barium and sodium are present as typical cations, while the anions are bicarbonate, sulfate and chloride as indicated together with silica. Assuming that alkalinity is particularly due to bicarbonates, and that sulphate and chloride ions are present in relatively low concentration but with considerable silica present, then, in accordance with the invention the raw water is fed to cation exchangers 4 containing a carboxylic resin 6 typified by Rohm & Haas IRC–84, which compared with the strongly acidic cation exchange resins is relatively weakly acidic. The three exchangers 4 which are illustrated are provided for continuous operation, two of them remaining active while the third is undergoing regeneration.

The effluent from these cation exchangers will typically involve substantially complete removal of the cations calcium, magnesium and barium, but with only partial removal of sodium, the composition of this effluent being typically as shown in colum B of FIGURE 2. Considering equivalents of calcium carbonate, as usual, the sodium may be typically reduced from 18.4 p.p.m. to 4.9 p.p.m. All of the heavy metals are typically reduced by the carboxylic type resin to negligible quantities. The residual sodium content in most cases is immaterial either for boiler feed or for cooling tower feed.

For boiler feed it is desirable to remove the carbon dioxide by passing the effluent, in part, in the instance under discussion, at 10 to the decarbonator 12 of conventional type in which the water passes over extended surface elements 14 and is subject to the flow of air from a pump 16. The result of this is to reduce the carbon dioxide content to a negligible and unobjectionable extent, the effluent from the decarbonator being indicated in column C of FIGURE 2.

The effluent from the decarbonator accordingly comprises the cation sodium and the sulfate, and chloride anions together with the original silica.

From the decarbonator, a pump 18 delivers the water through connection 20 to the hydroxyl type anion exchangers 22. In passing through the resin therein, the residual anions are largely removed. The sulphate and carbonate anions are here reduced to mere traces. Typically an initial content of 10 p.p.m. of silica may be reduced to 0.7 p.p.m., as indicated in column D of FIGURE 2. The effluent is delivered to the line 24 and may be delivered at 26 to a boiler, containing substantially only sodium hydroxide together with the small amount of silica just mentioned. For most boiler purposes this represents a satisfactory feedwater considering the usual blowdown which is carried out from time to time as solids accumulate in solution. The sodium hydroxide content will in general be amply large to prevent precipitation of silica.

As indicated by the valved connections at 28 and 30, the effluents from the cation exchangers and from the anion exchangers may be combined in desired proportions to provide at 32 feed for a cooling tower having for a 50-50 blending, the composition shown in column E of FIGURE 2. The proportioning for this purpose may be made for what is regarded as optimum conditions. So far as a cooling tower is concerned, it is generally immaterial that the feedwater contains carbon dioxide since the content of this will be automatically reduced in normal cooling tower operation which effects decarbonation. Use of the mixture for a cooling tower feed instead of the effluent from the anion exchanger unit results in a considerable saving in both first cost and operating cost for this anion unit. The silica content of the mixed feed is low enough for the cooling system.

With the removal of the heavy metals what typically enters the cooling tower as makeup at 32 results in equilibrium accumulation of solutes which is unobjectionable and which does not require blowdown. This equilibrium is attained since mist will carry sufficient quantities of the water from the system. The chromate present in the cooling tower water is not lost except to the extent that it may be carried away in the mist so that minimum makeup of chromate is required.

Economy of operation is particularly involved in the saving of regenerants. Whereas the more acidic cations resins may require typically 150 to 200° of the stoichiometric quantity of strong acid for regeneration, using the carboxylic type of resin, the amount of acid required for regeneration is only 105 to 110% of what would theoretically be required stoichiometrically. This in itself represents a very substantial saving in operation. But further, when a highly acidic cation exchange resin is used, the large excess of acid enters the rinse water and this is not generally permissible for discharge into a stream or ground water but must be neutralized, involving a further waste of alkali. Considering that regeneration of the anion exchange resin beds is accomplished by the addition of caustic soda, as indicated at 36, the rinse containing this may be used to effect, at least in part, neutralization of the relatively little acid in the rinse from the cation exchange units. This economy in the use of the regenerants involves only the minor penalty of incomplete removal of sodium in the cation exchange, and this may be tolerated for reasons already indicated. Less expensive sulfuric acid may be used equivalently to the hydrochloric acid indicated as the regenerant at 34, but hydrochloric acid has been shown as the regenerant in view of the assumption of the presence of barium in the raw water. Accumulation of the barium in the cation exchange resin will bring it to a concentration such that if sulfuric acid were used it would remain deposited on the resin, barium sulfate having a very low solubility. Soluble barium chloride is produced when the regenerant is hydrochloric acid.

The anion exchange resin may be of any conventional strongly basic type. It will be noted that from the standpoint of interest the anion exchange resin serves particularly to remove silica.

It will be evident that the proportions of the various materials given may vary in accordance with the composition of the raw water. It will be further evident that various modifications may be made without departing from the invention as defined in the following claims.

What is claimed is:

1. The method of treating water for the reduction of its silica content comprising causing the water to flow through a cation exchange resin of the carboxylic type capable of substantially complete removal of heavier metal cations such as calcium and magnesium, but only partial removal of alkali metal cations, causing at least part of the effluent from the cation exchange resin to flow through an anion exchange resin of hydroxyl exchange type capable of removing acid anions and the substantial reduction of silica and providing an alkaline effluent, and utilizing at least part of the last mentioned effluent for admixture with another part of the effluent from said cation exchange resin to provide water with hardness removed and a silica content less than that of the original water.

2. The method of claim 1 including the removal of carbon dioxide from that part of the effluent from the cation exchange resin which enters the anion exchange resin.

3. Apparatus for water treatment for the reduction of its silica content comprising a bed of cation exchange resin of the carboxylic type capable of substantially complete removal of heavier metal cations, such as calcium and magnesium, but only partial removal of alkali metal cations, means providing flow of water through said bed, a bed of anion exchange resin of hydroxyl exchange type capable of removing acid anions and the substantial reduction of silica and providing an alkaline effluent, means directing at least part of the effluent from said cation exchange bed to said anion exchange bed, and means combining effluent from the second mentioned bed with another part of the effluent from the first mentioned bed.

4. The apparatus of claim 3 including means for removing carbon dioxide from that part of the effluent from the first bed which enters the second bed.

References Cited

UNITED STATES PATENTS

| | | | |
|---|---|---|---|
| 2,422,054 | 6/1947 | Tiger | 210—37 X |
| 2,711,995 | 6/1955 | Sard | 210—252 X |
| 2,807,582 | 9/1957 | Applebaum | 210—37 X |
| 2,841,550 | 7/1958 | Beohner | 210—37 X |
| 2,855,363 | 10/1958 | Kittredge | 210—38 X |
| 3,147,215 | 9/1964 | Blight | 210—38 X |
| 3,197,401 | 7/1965 | Arai | 210—37 X |
| 3,250,705 | 5/1966 | Levendusky | 210—38 X |
| 3,382,169 | 5/1968 | Thompson | 210—37 X |

FOREIGN PATENTS 1,274,871   9/1961   France.

OTHER REFERENCES

Bauman et al., "Silic-Free Boiler Feed Water by Ion Exchange," I/EC, vol. 39, No. 11, November 1947, pp. 1453–1457.

Gilwood et al., "Silica Removal Characteristics of Highly Basic Anion Exchangers," J. Am. Water Works Assoc., vol. 44, No. 11, November 1952, pp. 1057–1064.

REUBEN FRIEDMAN, Primary Examiner

C. M. DITLOW, Assistant Examiner

U.S. Cl. X.R.

210—37, 38, 188, 259